United States Patent [19]
Gutleber

[11] 3,783,389

[45] Jan. 1, 1974

[54] MEDIAN FREQUENCY GENERATOR

[75] Inventor: Frank S. Gutleber, Little Silver, N.J.

[73] Assignee: The United States of America as represented by the Secretary of the Army, Washington, D.C.

[22] Filed: May 31, 1972

[21] Appl. No.: 258,273

Related U.S. Application Data

[63] Continuation-in-part of Ser. No. 142,963, May 27, 1971.

[52] U.S. Cl. .................... 328/15, 328/133, 328/134, 328/158, 307/237, 307/295

[51] Int. Cl. .......................................... H03b 19/00

[58] Field of Search ............................ 307/295, 237; 328/14, 15, 133, 134, 158

[56] References Cited

UNITED STATES PATENTS

| | | | |
|---|---|---|---|
| 2,866,092 | 12/1958 | Raynsford | 328/133 |
| 2,992,326 | 7/1961 | Kahn | 328/15 X |
| 2,920,289 | 1/1960 | Meyer | 328/15 |
| 3,333,205 | 7/1967 | Featherston | 328/63 |
| 3,449,669 | 6/1969 | Grandquist | 328/15 |
| 3,517,216 | 6/1970 | Cope | 307/237 |
| 3,601,705 | 8/1971 | Germann et al. | 328/55 |
| 3,639,779 | 3/1971 | Garrigus | 307/237 |
| 3,648,071 | 3/1972 | Mrazek | 307/237 |
| 3,656,003 | 4/1972 | Chen et al. | 307/328 |
| 3,701,026 | 10/1972 | Gutleber | 328/15 |

*Primary Examiner*—John S. Heyman
*Assistant Examiner*—Joseph E. Clawson, Jr.
*Attorney*—Harry M. Saragovitz et al.

[57] ABSTRACT

The median frequency generator linearly adds two input signals having the same amplitude to obtain a third signal having a frequency equal to the median of the frequencies of the two input signals, an amplitude which varies with time, and a phase which reverses at a frequency equal to the difference in the frequencies of the input signals. Timing pulses are generated by a flip-flop in synchronism with the phase reversals and are used as gating signals to invert the phase reversed portions of the third signal to produce the median frequency output signal.

4 Claims, 21 Drawing Figures

MEDIAN FREQUENCY GENERATOR

This application is a Continuation-in-Part of application Ser. No. 142,963 entitled "Median Frequency Generator," filed May 27, 1971 of Frank S. Gutleber.

The present invention relates to frequency synthesizers and more particularly to a median frequency generator.

The general purpose of this invention is to provide a median frequency generator which may be used as a basic building block for use in constructing frequency synthesizing systems having the characteristic of generating a plurality of uniformly spaced frequencies each synchronized to a master clock. Using the median frequency generator of the type contemplated in the present invention, any number of spectral frequencies can be generated with the use of only two oscillators, one a reference oscillator or clock and the other synchronized to it. The only source of drift will be from the reference clock. If it does drift, the entire spectrum of output frequencies will shift with it making the system useful in correlation devices.

Other objects and features of the invention will become apparent to those skilled in the art as the disclosure is made in the following description of a preferred embodiment of the invention as illustrated in the accompanying sheets of drawing in which.

Figure 1:
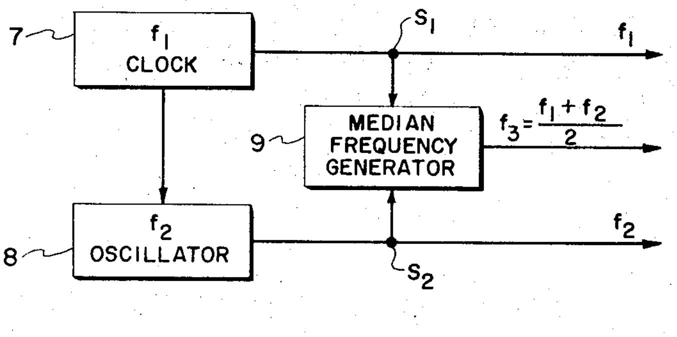
FIG. 1 shows a block diagram of a frequency spectrum synthesizer using the generator of the present invention.

Referring now to the drawing, there is shown in FIG. 1 a frequency spectrum synthesizer having a clock 7 for generating a signal $S_1$ having a frequency $f_1$, and an oscillator 8 synchronized with clock 7 for generating a signal $S_2$ having a frequency $f_2$. Connected to the outputs of clock 7 and oscillator 8 is median frequency generator 9 which generates a signal $S_3$ having a frequency $f_3$ equal to the median of the frequencies $f_1$ and $f_2$. Additional frequencies may now be synthesized by simply repeating the basic structure shown in FIG. 1. For example, an additional median frequency generator may use the outputs of clock 7 and generator 9 to produce a signal having a frequency which is the median of $f_1$ and $f_3$, or use the outputs of the oscillator 8 and the generator 9 to produce a frequency equal to the median of $f_3$ and $f_2$. A complete frequency synthesizer system having any number of signals of equally spaced frequencies synchronized with the signal $S_1$ generated by clock 7 may therefore be built with the median frequency generator as a building block.

Figure 2:
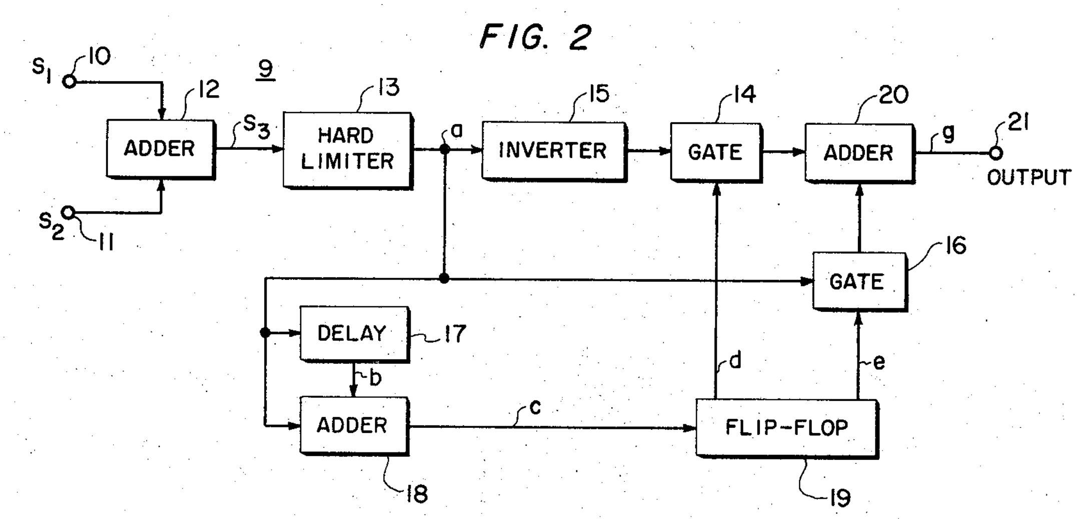
FIG. 2 shows a block diagram of a preferred embodiment of the median frequency generator.

Referring now to FIGS. 2 and 3A to 3H there is shown in greater detail the structure of the median frequency generator 9 and a set of associated waveforms. Input signals $S_1$ and $S_2$ are connected to the input terminals 10 and 11, respectively of linear adder 12. In the example shown in FIG. 3A, the signals $S_1$ and $S_2$ have frequencies which are related such that nine cycles of signal $S_1$ cover the same time period as eight cycles of signal $S_2$. This relationship is only used as an example and is not meant to be restrictive, since the device of the present invention will operate regardless of the relative relationships of the frequencies of signals $S_1$ and $S_2$. The linear addition of signals $S_1$ and $S_2$ is shown by waveform $S_3$ in FIG. 3B which represents the output of linear adder 12. The signal $S_2$, as shown in FIG. 2, is applied to the input of a hard limiter 13 which will produce the waveform *a* of FIG. 3C.

The hard limiter 13 is a device which limits the signal, both positive and negative at a level very close to zero. The hard limiter 13, therefore removes the envelope variations ffrom signal $S_3$ and produces a signal *a* which has two of the characteristics of signal $S_3$. The first characteristic which signal *a* has in common with signal $S_3$ is that both signals go to zero simultaneously. This characteristic of signal *a* is a result of the inherent zero level detection function of the hard limiter 13 which looks at the amplitude of signal $S_3$ only when it is at or very near zero. The second characteristic which signal *a* has in common with signal $S_3$ is that both signals have the same polarity. This characteristic of signal *a* is a result of the inherent function of the hard limiter 13. Of course, these two important features of signal *a* can be generated by means other than hard limiter 13. For example, there are numerous two state trigger devices which will change state when the input passes through zero and can therefore be used as a zero level detector in place of hard limiter 13. Also, polarity sensors are common in the art and can be used to regulate the polarity of the output of the previously mentioned trigger device. Therefore, the hard limiter 13 is considered to be merely an example of a zero level detector and polarity discriminator.

Figures 3A, 3B, 3C, 3D, 3E, 3F, 3G, 3H:
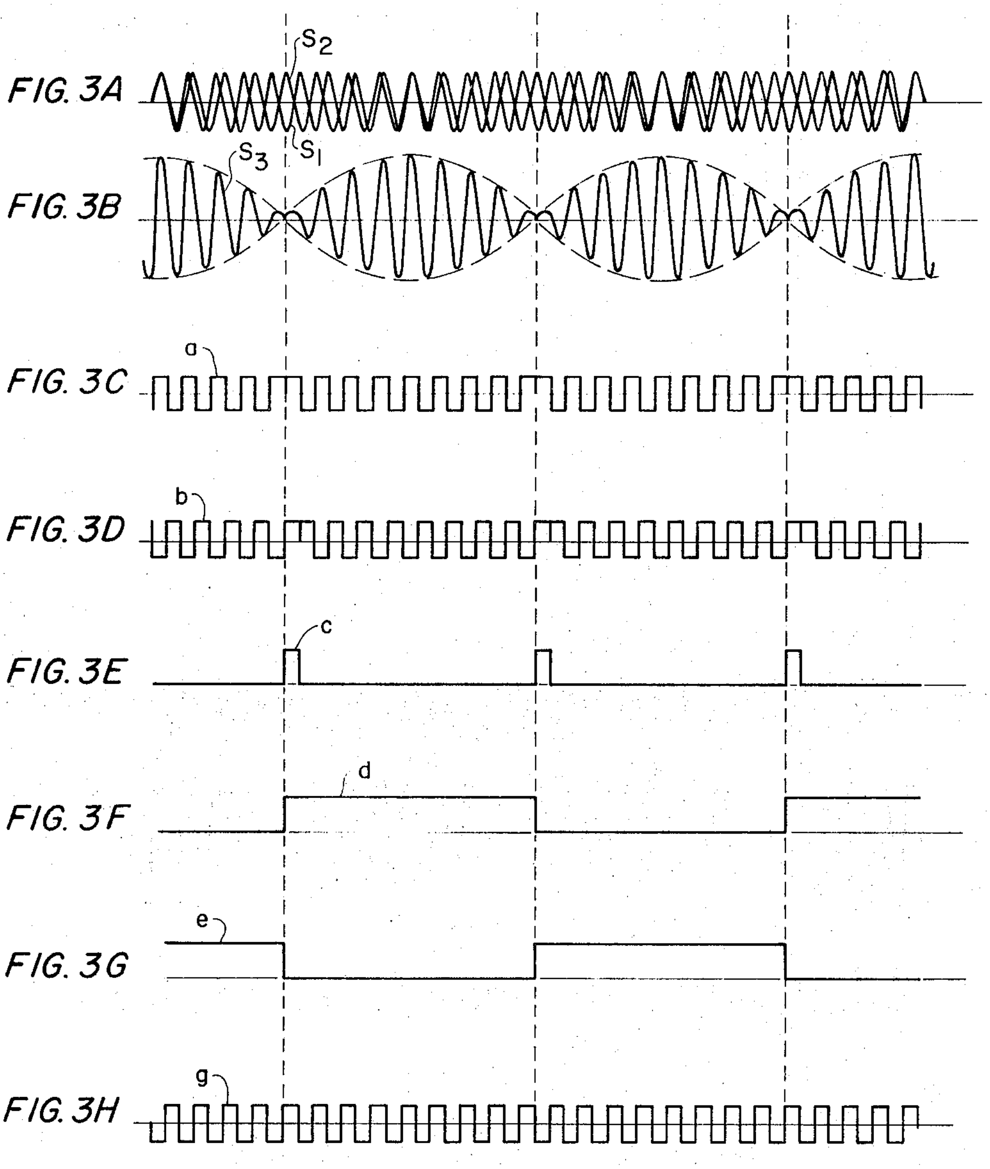
FIGS. 3A to 3H are a set of waveforms useful in illustrating the operation of the invention.

Phase reversal discrimination may now be accomplished with the signal *a* with the delay 17 and adder 18. By first delaying the signal *a* one-half cycle and then adding it to an undelayed version, the result will be a cancellation of the signals at all points except where a phase reversal occurs. Signal *a* is therefore first delayed by delay 17 for a time period equal to one-half cycle of the median frequency $f_3$ of the signals $S_1$ and $S_2$ to produce the signal *b* as shown in FIG. 3D. Signals *a* and *b* are then added in linear adder 18 to produce the signal *c* of FIG. 3E which will be used as a trigger input to a flip-flop 19. In the example of FIG. 3E, the pulse train *c* is a series of simple positive rectangular pulses because of the relationship between the frequencies $f_1$ and $f_2$. For other frequency relationships, as will be described in connection with FIGS. 5A to 5J, the pulses *c* may take other shapes or may both be negative and positive, etc. However, in all cases, the flip-flop 19 may simply be designed to trigger at some predetermined portion of the pulses *c*, e.g., the leading edge, to produce the complementary outputs represented by the signals *d* and *e* of FIGS. 3F and 3G respectively. Signal *a* is also applied to one of the inputs of transmission gate 14 via inverter 15 and directly to one of the inputs of transmission gate 16. The other inputs to transmission gates 14 and 16 are combined in the linear adder 20 to produce the signal *g* of FIG. 3H at the output terminal 21. As can be seen from the waveforms drawn in FIGS. 3A to 3H, the resulting signal *g* has a frequency which is the median of frequencies $f_1$ and $f_2$, i.e., 8.5 cycles of signal *g* cover the same time period as 9 cycles of signal $S_1$ and 8 cycles of signal $S_2$.

When the frequencies of signals $S_1$ and $S_2$ are separated by a substantial amount, the waveforms of FIGS.

5A to 5J will be typical. For example, the signal $S_1$ of FIG. 5A undergoes five cycles for each complete cycle of the signal $S_2$ of FIG. 5B. These signals $S_1$ and $S_2$ when added in the linear adder 12 will produce the signal $S_3$ of FIG. 5C. The rate at which the signal $S_3$ of FIG. 3B undergoes a phase reversal is substantially less than the median frequency $f_3$ to be generated. For this reason the phase reversals and the envelope are not obvious in the signal of $S_3$ of FIG. 5C and phase reversal discrimination will produce a complex signal. However, the device of FIG. 2 will still operate to produce the median frequency signal $g$ of FIG. 5J at the output terminal 21 as will be seen below.

Figure 5A:
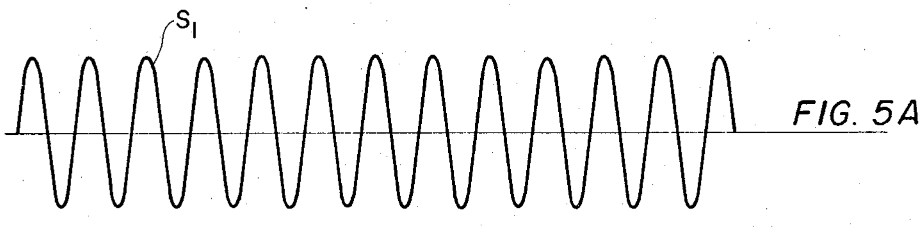
FIGS. 5A to 5J are a second set of waveforms useful in illustrating the operation of the invention. 3 *f*
Figure 5B:
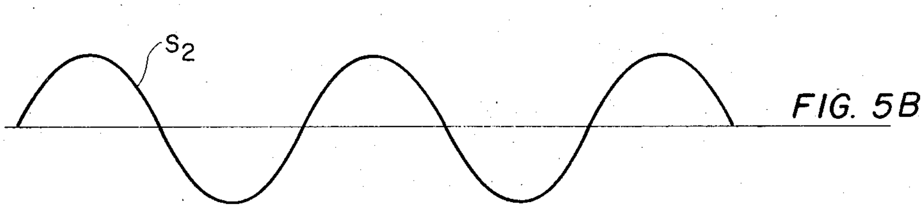
Figure 5C:
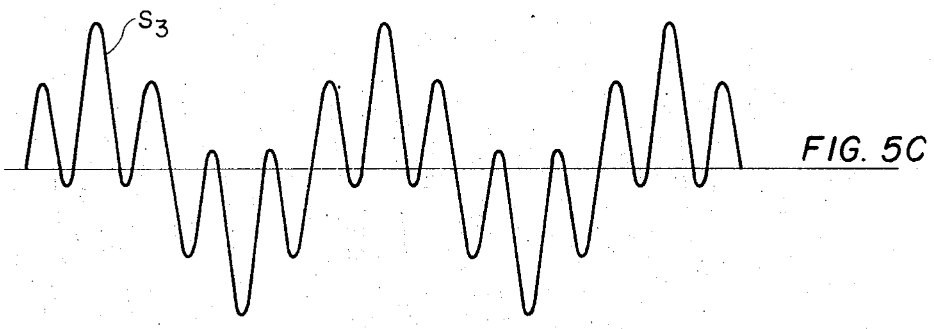
Figures 5D, 5E, 5F, 5G, 5H, 5I, 5J:
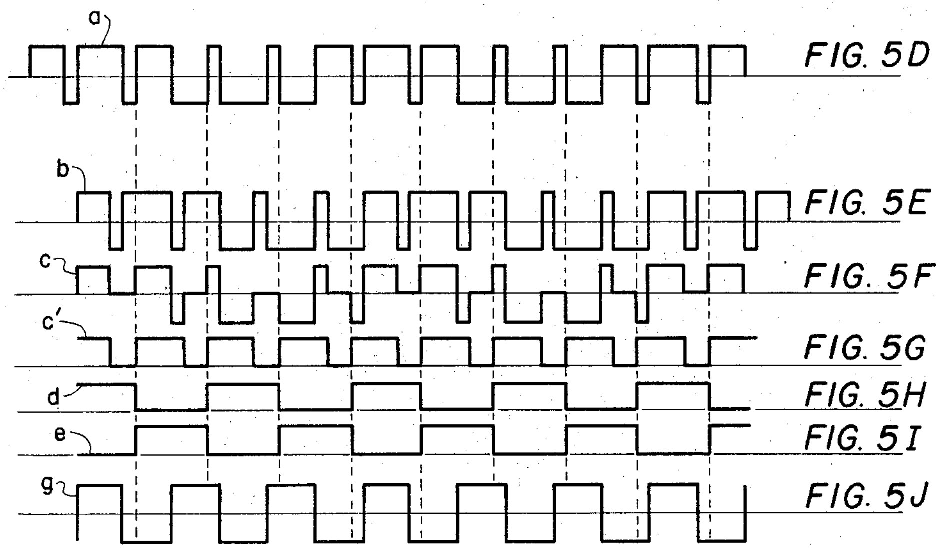

The signal $S_3$ of FIG. 5C is hard limited by the hard limiter 13 to detect all of the zero crossings of the signal $S_3$ and produce the signal $a$ of FIG. 5D. The signal $a$ at the output of limiter 13 will cross the zero axis simultaneously with the zero crossings in the signal $S_3$ of FIG. 5C and will also have the same polarity as the signal $S_3$. The signal $b$ of FIG. 5E is generated by delaying the signal $a$ in delay 17 by an amount equal to one-half cycle of the median frequency $f_3$. Signals $a$ and $b$ of FIGS. 5D and 5E respectively are then added in linear adder 18 to produce the signal $c$ of FIG. 5F. The signal $c$ of FIG. 5F is the result of the phase reversal discriminating means, viz. delay 17 and adder 18, and will now contain the information as to when the phase reversals have taken place. Therefore, the signal $c$ of FIG. 5F is used as the input to the flip-flop 19 to produce the signals $d$ and $e$ of FIGS. 5H and 5I respectively.

It is pointed out that the flip-flop 19 must change state at specified locations on the signal $c$ of FIG. 5F. The phase reversal discriminating signal $c$ of FIG. 5F is somewhat more complex than the signal $c$ of FIG. 3E. The specific locations on signal $c$ of FIG. 5F which represents a phase reversal in the signal $S_3$ of FIG. 5C are those points where a pulse appears just after cancellation of the inputs. In other words a phase reversal takes place at those points where the signal $c$ makes either a negative or positive transition after having a zero amplitude for some substantial finite time. These points are indicated by the dotted vertical lines in FIGS. 5D–5J. The flip-flop 19 must include some standard trigger input mechanism which would cause a change in state at these points.

Figure 4:
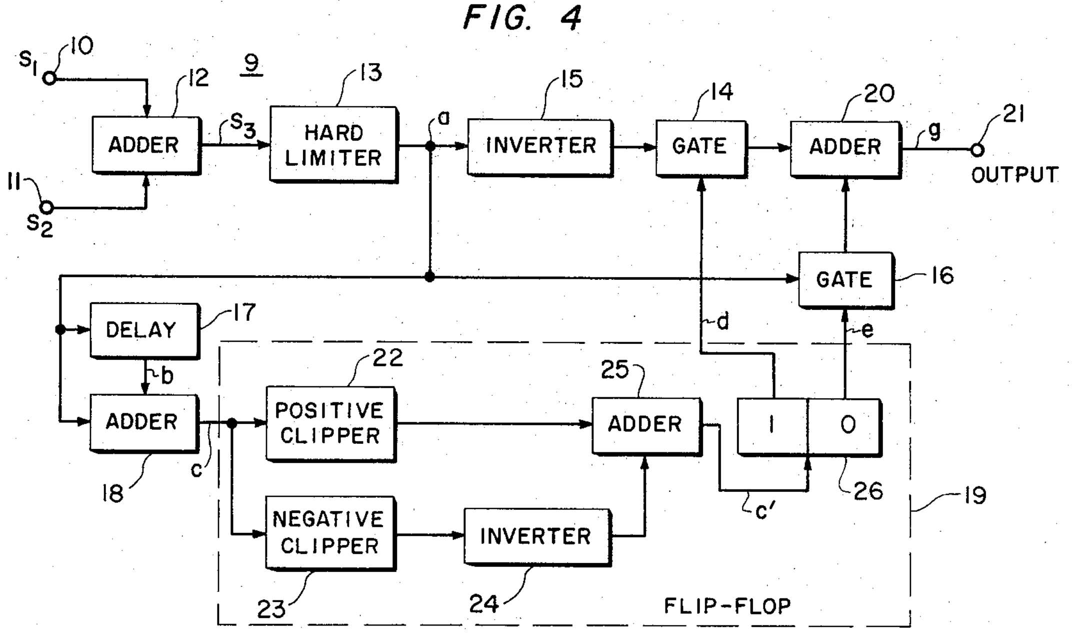
FIG. 4 shows a block diagram of a more specific embodiment of the median frequency generator of FIG. 2.

The device as shown in FIG. 4 is a more detailed form of the device in FIG. 2 showing specifically a preferred trigger means which will convert the complex signal $c$ of FIG. 5F into the simpler form of signal $c$ of FIG. 5G so that it will look more like the signal $c$ of FIG. 3E. More specifically, flip-flop 19 in the device of FIG. 4 has a trigger mechanism which includes the positive clipper 22, the negative clipper 23, the inverter 24, and the adder 25. In effect, the negative clipper 23 and inverter 24 inverts only the negative portions of signal $c$ of FIG. 5F and converts them into positive portions which are then combined in the adder 25 with the positive portions of signal $c$ to produce the signal $c$ of FIG. 5G. Signal $c$ in flip-flop 19 of FIG. 4 is then applied to the input of the standard set-reset device 26 to produce the complementary outputs $d$ and $e$ of FIGS. 5H and 5I respectively.

The signals $d$ and $e$ of FIG. 4 are applied to the gates 14 and 16 respectively in the same manner and for the same purpose as previously explained with respect to the device of FIG. 2 to produce the output signal $g$ of FIG. 5J. Here again, signal $g$ is the median frequency signal having 3 cycles in the same time period that signal $S_1$ of FIG. 5A has 5 cycles and signal $S_2$ of FIG. 5B has 1 cycle. It should now be evident therefore that the present invention has no limitation on the relative values of the frequencies of signals $S_1$ and $S_2$ or the relative complexity of the combined signal $S_3$.

A more general explanation of the operation of the devices shown in FIG. 2 and FIG. 4 may be made analytically in the following manner. The signals $S_1$ and $S_2$ may be represented by the following expressions:

$$S_1 = S \sin 2\pi f_1 t$$

$$S_2 = S \sin 2\pi f_2 t$$

where $S$ is the peak amplitude of signals $S_1$ and $S_2$. By the superposition principle, the amplitude of the output signal $S_3$ of linear adder 12 may be represented by the following expression:

$$S_3 = S_1 + S_2 = S \sin (2\pi f_1 t) + S \sin (2\pi f_2 t)$$

The above sum may be converted into the following form:

$$S_3 = [\, 2S \cos 2\pi (f_1 - f_2/2)t] \sin 2\pi (f_1 + f_2/2)t$$

The resulting signal $S_3$ may then be considered to have a frequency $$f_3 = f_1 + f_2/2$$

which is the median frequency of the signals $S_1$ and $S_2$, and an amplitude given by the expression in brackets. Hence, the amplitude varies with time at a frequency:

$$f_4 = f_1 - f_2/2$$

Because of this amplitude modulation, the signal $S_3$ will undergo a phase reversal each time the bracketed portion or $\cos 2\pi (f_1 - f_2/2)\, t$ equals zero, i.e., each time the envelope passes through zero.

Therefore, in effect the linear addition of signals $S_1$ and $S_2$ results in a signal $S_3$ which basically oscillates at the median frequency $f_3$, but reverses phase at a frequency $$2f_4 = f_1 - f_2$$

Generation of the median frequency signal with no phase reversals is accomplished by simply inverting the phase reversed portions of signal $S_3$. To accomplish this, the hard limiter 13 shapes the signal $S_3$ by removing the envelope and by detecting all of the zero values and polarities of signal $S_3$. Phase reversal discrimination is then accomplished by the delay 17 and adder 18 to produce timing signals at those zero values which are due to phase reversals in the signal $S_3$. These timing signals are then used to trigger a flip-flop 19 to obtain synchronous gating pulses for transmitting the in-phase portions of the output of hard limiter 13 through gate 16, and for transmitting an inverted replica of the out-of-phase portions via gate 14. The outputs of gates 14 and 16 are then combined in adder 20 to produce the output signal $S_3$ at terminal 21.

It should be understood, of course, that the foregoing disclosure relates to only a preferred embodiment of the invention and that modifications or alterations may be made therein without departing from the spirit and the scope of the invention as set forth in the appended claims.

What is claimed is:

1. A device for generating an output signal having a frequency which is the median of the frequencies of a pair of original input signals comprising;

adder means for receiving said original input signals and for generating a sum signal having a frequency equal to said median frequency and phase reversal points occurring at a frequency equal to one-half the difference between the frequencies of said input signals;

zero level detector means connected to the output of said adder means for detecting all of the zero level locations of said sum signals;

phase reversal discriminating means connected to the output of said zero level detector means for detecting the locations of those zero levels in which a phase reversal occurs and for generating timing signals in response thereto; and transmitting means including phase reversal means responsive to said timing signal for selectively inverting the phase of said sum signal to remove said phase reversal points and for transmitting said sum signal at said median frequency.

2. The device according to claim 1 and wherein said zero level detector means comprises means for generating a rectangular wave having a polarity equal to and in phase with the polarity of said sum signal.

3. A device for generating an output signal having a frequency which is the median of the frequencies of a pair of original input signals comprising;

first adder means for receiving said original input signals and for generating a sum signal having a frequency equal to said median frequency and phase reversal points occurring at a frequency equal to one-half the difference between the frequencies of said input signals;

rectangular wave generating means connected to the output of said first adder means for generating a rectangular wave having leading and trailing edges in phase with the zero levels of said sum signal and having polarities in phase and equal to the polarities of said sum signal;

delay means connected to the output of said rectangular wave generating means for delaying one-half cycle the output thereof;

second adder means for linearly adding the outputs of said rectangular wave generating means and said delay means for producing a series of timing pulses;

bistable multivibrator means including trigger means and a two-state complementary output means;

said trigger means including a positive clipper means and a negative clipper means the input of each connected to the output of said second adder means;

the output of said negative clipper means connected to the input of a first inverter means;

a third adder means having one input connected to the output of said positive clipper means and a second input connected to the output of said inverter means;

the output of said second adder means connected to the input of said two state complementary output means for changing the state thereof; and transmitting means including phase reversal means responsive to the outputs of said two state complementary output means for selectively inverting portions of said rectangular wave for transmitting said rectangular wave at said median frequency.

4. A device according to claim 3 wherein said transmitting means includes;

a second inverter means connected to the output of said rectangular wave generating means for inverting said rectangular wave;

first and second transmission gate means each having a transmission input and a gating input and having said transmission inputs thereof connected to the outputs of said second inverter means and said rectangular wave generating means respectively for transmitting said rectangular wave and said inverted rectangular wave respectively upon receiving a pulse at said gating inputs; and said gating inputs connected to the outputs of said two state complementary output means whereby said transmission gates alternately transmit said rectangular wave and said inverted rectangular wave.

* * * * *